United States Patent [19]

Moore et al.

[11] Patent Number: 4,790,589
[45] Date of Patent: Dec. 13, 1988

[54] REMOVABLE PIVOTABLE TAILGATE

[76] Inventors: Larry R. Moore, 22833 Dequindre, Hazel Park, Mich. 48030; David Juhnke, 42235 Nottingwood Ct., Northville, Mich. 48167

[21] Appl. No.: 65,336
[22] Filed: Jun. 22, 1987
[51] Int. Cl.⁴ .............................................. B62D 25/00
[52] U.S. Cl. ...................................... 296/50; 296/52; 49/255
[58] Field of Search ...................... 296/50, 52; 49/255

[56] References Cited

U.S. PATENT DOCUMENTS

| 174,259 | 2/1876 | Kime | 49/158 |
|---|---|---|---|
| 557,550 | 2/1896 | Butcher et al. | 49/158 |
| 647,228 | 4/1900 | Hendricks | 49/158 |
| 1,524,669 | 2/1925 | Milner | 296/43 |
| 2,506,849 | 5/1950 | Winterton | 296/51 |
| 3,600,032 | 11/1969 | Gross | 296/50 |
| 4,416,482 | 11/1983 | Patterson | 296/50 |

Primary Examiner—Robert R. Song
Attorney, Agent, or Firm—Basile and Hanlon

[57] ABSTRACT

A tailgate is hingedly mounted for movement about a vertical axis rearwardly and outwardly offset from a vertical post adjacent the rear corner of the load carrying bed of a vehicle. The tailgate is mounted upon the post by a hinge assembly which accommodates vertical movement of the gate relative to the vehicle bed along the hinge axis to enable vertical stakes projecting downwardly from the tailgate to be inserted into and removed from upwardly opening apertures in the vehicle bed to accommodate hinging movement of the gate to and from a positively maintained closed position.

2 Claims, 1 Drawing Sheet

U.S. Patent  Dec. 13, 1988  4,790,589
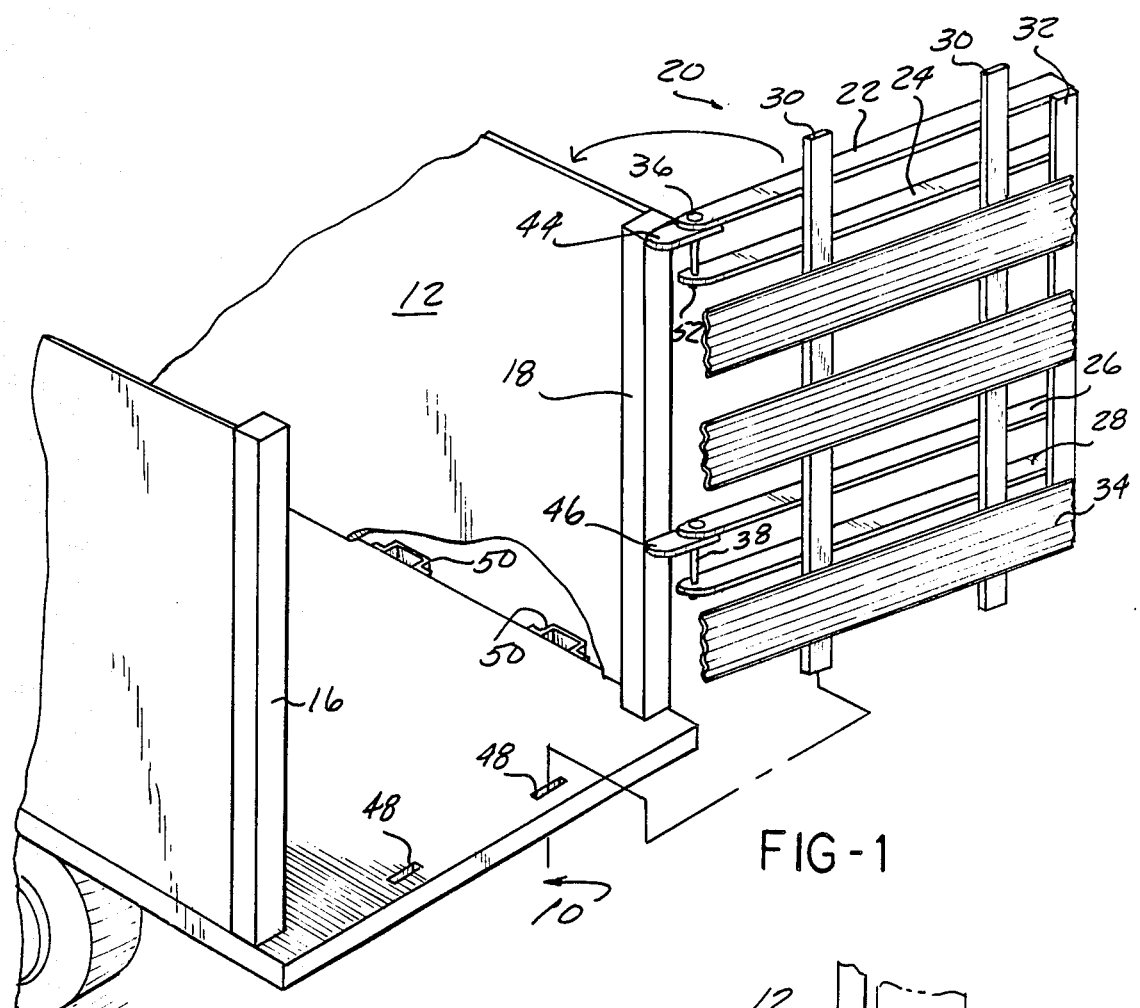
FIG-1
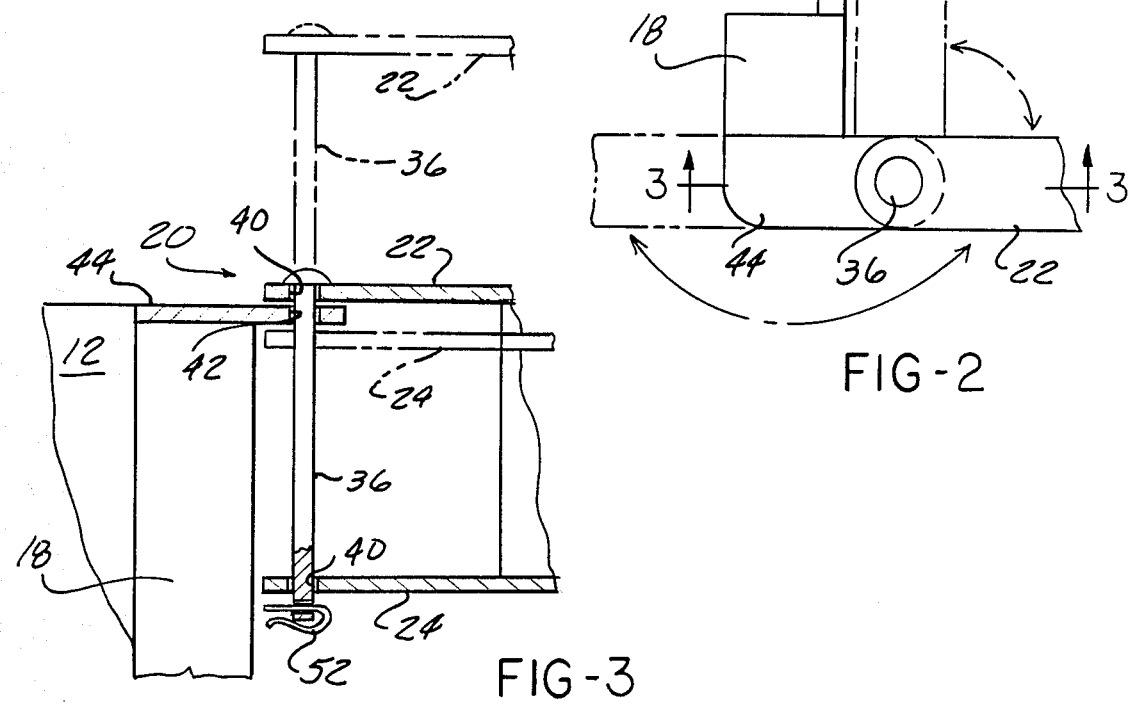
FIG-2
FIG-3

REMOVABLE PIVOTABLE TAILGATE

BACKGROUND OF THE INVENTION

The present invention is directed to a tailgate for closing the rearward end of the load carrying bed of a vehicle such as a truck or trailer in which the gate may be freely swung about a vertical hinge axis at one side of the gate and positively retained in either of a closed or a stored position.

SUMMARY OF THE INVENTION

In accordance with the present invention, a pair of vertically spaced horizontally disposed hinge plates are fixedly mounted upon a vertical post located at a rear corner of the load carrying bed of the vehicle. The hinge plates are provided with vertically aligned bores which define a vertical hinge axis rearwardly and outwardly offset from the post. The tailgate frame includes two pairs of horizontally extending frame members fixedly secured in parallel relationship to each other by two or more vertically extending stake members which are fixedly secured, as by welding, to the horizontal frame members at each point of intersection. Aligned vertical bores through the horizontal frame members near one end of the members are provided to enable the frame members to be coupled to the hinge plates by means of upper and lower hinge pins, each hinge pin passing through the bores of a pair of frame members and the associated hinge plate with the hinge plate being located vertically between the two frame members of the pair. The frame members of each pair are spaced vertically from each other by a distance such that the tailgate may be raised and lowered relative to the hinge plates over a range of vertical movement limited by the spacing between the frame members.

The vertically disposed stake members of the tailgate frame project downwardly to be received in apertures in the load carrying bed of the vehicle when the tailgate is at its lower limit of movement on the post in which the upper frame member of each pair rests upon the top of its associated hinge plate. The range of vertical movement accommodated by the vertically spaced horizontal frame members is sufficeint so that the gate may be lifted upwardly a distance sufficient to withdraw the lower ends of the stakes from the apertures in the bed to enable the gate to be swung to an open position. Brackets mounted on the side of the vehicle may similarly receive the lower ends of the stakes to retain the tailgate in a stored position in face-to-face relationship with the outer side of the vehicle.

Other objects and features of the invention will become apparent by reference to the following specification.

IN THE DRAWINGS

FIG. 1 is a perspective view of the rear portion of a vehicle having a tailgate assembly embodying the present invention;

FIG. 2 is a top plan view showing details of the tailgate hinge assembly;

FIG. 3 is a detail cross-sectional view of a hinge assembly taken on line 3—3 of FIG. 2.

Referring first to FIG. 1, there is shown the rear portion of a vehicle, which may be a truck or a trailer, having a flat load carrying bed 10 having upwardly projecting sidewalls 12 and a pair of vertically extending posts 16, 18 fixedly secured to and projecting upwardly from bed 10 adjacent each of the rear corners of the bed. A tailgate designated generally 20 is mounted on one of the posts 18 for hinging movement between an open position shown in FIG. 1 and closed position in which tailgate 20 extends between posts 16 and 18 to close the opening between the two posts.

Tailgate 20 is of a generally rectangular configuration and is constructed with a rigid frame which includes a first or upper pair of elongate horizontally extending frame members 22, 24, a second pair or lower pair of elongate horizontally extending frame members 26, 28 and a pair of horizontally spaced vertically extending frame members or stakes 30 which are fixedly secured, as by welding, to the frame members 22, 24, 26 and 28 at each point of intersection. Where desired, additional rigidity may be provided with a third vertically extending frame member 32 welded to frame members 22, 24, 26, 28 at the free vertical side edge of the tailgate. Additional horizontally extending auxiliary frame members in the form of corrugated sheet metal panels 34 may be welded to the inner sides of the frame members 30 as desired. Where panels 34 are employed, referring to FIG. 1, the ends of panels 34 adjacent post 18 are terminated short of the ends of frame members 22, 24, 26 and 28 so that panels 34 will clear post 18 when the gate is closed.

Tailgate 20 is hingedly mounted upon post 18 by upper and lower pivot pins 36, 38 which pass through vertically aligned bores 40 (FIG. 3) in frame members 22, 24 and through similar bores in frame members 26, 28. Pin 36 also passes through, as best seen in FIG. 3, a bore 42 in an upper hinge plate 44 which is fixedly secured, as by welding, to post 18 at or near the upper end of the post. A second hinge plate 46 of similar construction is fixedly secured to post 18, as best seen in FIG. 1. The vertical spacing between hinge plates 44 and 46 is the same as the vertical spacing between the frame member 22 of the upper pair of frame members and frame member 26 of the lower pair of frame members. Frame members 22 and 26 normally gravatationally rest upon the upper sides of their respective associated frame plates 44 and 46.

As best seen in FIGS. 1 and 2, hinge plates 44 and 46 project rearwardly from post 18 and outwardly of the outer side of the post. The hinge axis established by the vertically aligned bores in plates 44 and 46 is thus located both rearwardly and outwardly of the post so that tailgate 20 may be hinged upon the post through 270° from a stored position where the tailgate lies in face-to-face engagement with the outer side of sidewall 12 and a closed position in which tailgate 20 extends across the rear edge of bed 10 between posts 16 and 18.

Tailgate 20 is retained in the closed position by seating the lower ends of stakes 30 in two apertures 48 in bed 10 near the rearward end of the bed. Stakes 30 project downwardly below frame member 28 a sufficient distance such that when frame members 22 and 26 rest upon their respective hinge plates 44, 46, the lower ends of stakes 30 project downwardly into the apertures 48. The vertical spacing between frame members 22 and 24 and between frame members 26, 28 is such that gate 20 may be lifted vertically a sufficient distance to locate the lower ends of stakes 30 above the top surface of bed 10 to accommodate hinging movement of the gate to and from its closed position. Stake receiving brackets 50 may be mounted at the outer side of the vehicle body to secure tailgate 20 in a stored position in face-to-face engagement with the outer sidewall of the vehicle.

The gate may be readily detached from the vehicle by removing hinge pin retaining cotter pins 52 (FIG. 3) from the pins 36, 38 and withdrawing the pins to detach the gate from the hinge plates.

While on embodiment of the invention has been described in detail, it will be apparent to those skilled in the art that the disclosed embodiment may be modified. Therefore, the foregoing description is to be considered exemplary rather than limiting, and the true scope of the invention is that defined in the following claims.

We claim:

1. In a vehicle having a load carrying bed terminating at a rearward edge, a pair of rigid vertical posts fixed to and projecting upwardly from said bed respectively at opposite sides of said bed adjacent said rearward edge, and a tailgate having a generally rectangular rigid frame for closing the opening between said posts, the improvement comprising:

mounting means for hingedly and detachably mounting said tailgate on one of said posts, said mounting means comprising vertically spaced upper and lower hinge plates fixedly mounted on said one of said posts and projecting rearwardly from said one of said posts and outwardly from the outer side of said one of said posts, means defining a vertical pin receiving bore through each of said hinge plates, said bores having a common vertical axis displaced rearwardly and outwardly from the rear and outer sides of said one of said posts, a first pair of vertically spaced frame members on said tailgate frame projecting horizontally outwardly from one vertical side edge of said tailgate adjacent the top of said tailgate, a second pair of vertically spaced frame members on said tailgate frame projecting horizontally outwardly from said one vertical side of said tailgate at locations spaced below the respective first pair of frame members by a distance equal to the vertical spacing between said upper and lower hinge plates, means defining a vertical pin receiving bore through each of said frame members, said bores having a common vertical axis, upper and lower hinge pins respectively coupling said first pair of frame members to said upper hinge plate and said second pair of frame members to said lower hinge plate, each hinge pin projecting downwardly successively through the bores in the upper of the pair of frame members, the associated hinge plate, and the lower of the pair of frame members to mount said tailgate upon said post for hinging movement and for vertical movement relative to said post upwardly from a gravitationally maintained rest position wherein the upper and lower hinge plates are in underlying supporting engagement with the uppermost of the respective first and second pairs of frame members and an elevated position wherein the lowermost of the first and second pairs of frame members are in underlying engagement with the respective upper and lower hinge plates, means for releasably retaining said hinge pins against removal from said bores, a plurality of horizontally spaced vertical stakes fixedly mounted on said tailgate frame and projecting vertically downwardly from the lower edge of said tailgate by a distance less than the vertical spacing between the first pair of frame members, and means in said bed defining a plurality of upwardly opening stake receiving recesses in said bed located adjacent the rearward edge of said bed to receive said stakes when said tailgate is in said rest position to establish a closed position of said tailgate.

2. The invention defined in claim 1 wherein said frame members each comprise an elongate member extending horizontally across said tailgate, and said stakes each comprise an elongate rigid member extending vertically downwardly across said tailgate from the uppermost of said first pair of frame members, and means for fixedly securing all of said frame members to all of said stakes.

* * * * *